April 16, 1946.  D. L. BRINKLEY  2,398,354
MOTOR VEHICLE PERISCOPE
Filed Sept. 11, 1944
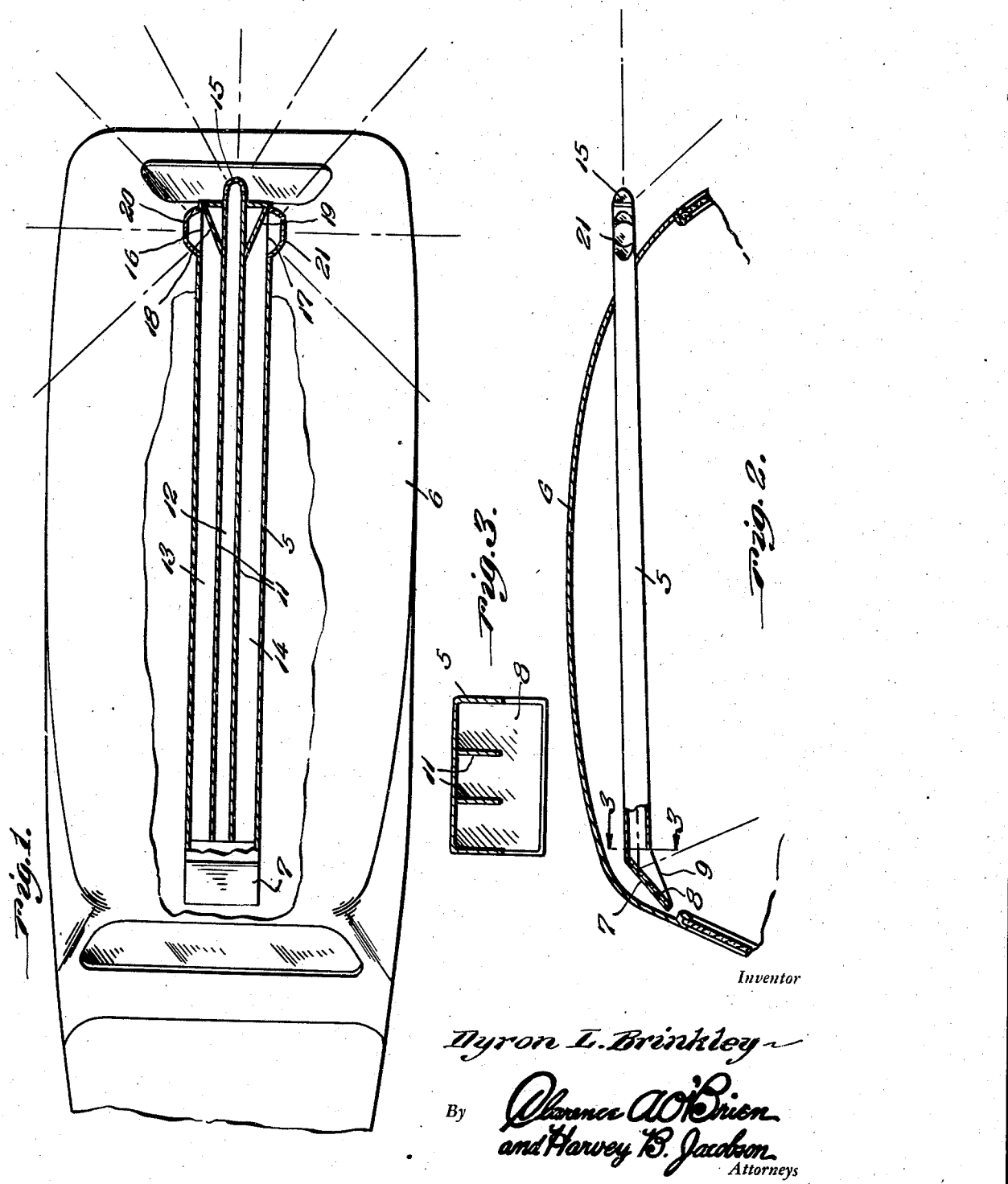
Inventor
*Myron L. Brinkley*
By *Clarence A. O'Brien
and Harvey B. Jacobson*
Attorneys Patented Apr. 16, 1946

2,398,354

UNITED STATES PATENT OFFICE 2,398,354

MOTOR VEHICLE PERISCOPE

Dyron L. Brinkley, Rodessa, La.

Application September 11, 1944, Serial No. 553,597

2 Claims. (Cl. 88—70)

The present invention relates to new and useful improvements in periscopes for motor vehicles adapted for installing in the top of an automobile or other motor vehicles and designed to give the driver of the automobile a clear view of traffic at each side rearwardly of the front of the automobile and also immediately rearwardly thereof whereby to facilitate the parking of the automobile adjacent a curbing and to give the driver view of traffic when backing out of an alley or other position where objects on each side may block his view.

A further important object of the invention is to provide a device of this character of simple and practical construction, which is efficient and reliable in performance, relatively inexpensive to manufacture and installed in operative position in the vehicle and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which—

Figure 1 is a top plan view with parts broken away and shown in section.

Figure 2 is a side elevational view with parts shown in section, and

Figure 3 is a transverse sectional view taken substantially on a line 3—3 of Figure 2.

Referring now to the drawing in detail wherein for the purpose of illustration I have disclosed a preferred embodiment of the invention, the numeral 5 designates a conduit constructed of light weight metal or other suitable material and mounted on the top of an automobile or other vehicle 6 with the rear end of the conduit projecting through the top of the vehicle at the rear thereof.

The front end of the conduit is located adjacent the windshield of the automobile and includes a sloping end wall 7 on the underside of which is suitably mounted a mirror or reflector 8 arranged at an inclination with respect to the driver so that the driver upon glancing upwardly may readily view said mirror, the bottom of the conduit being formed with an opening 9 whereby objects appearing in the rear end of the conduit will be observed by the driver.

The conduit 5 is provided with a pair of longitudinally extending vertical partitions 11 separating the conduit into a center compartment 12 and right and left compartments 13 and 14, respectively.

The center compartment 12 is open at its rear end and provided with a rounded transparent cover or lens 15.

The outer sides of the right and left compartments are formed with openings 16 and 17, respectively, behind which are inclined mirrors or reflectors 18 and 19, by means of which objects at the sides of the conduit will be reflected forwardly of the respective compartments.

The openings 16 and 17 are also formed with curved cupped transparent covers or lenses 20 and 21.

As shown to advantage in Figure 1 of the drawing, the angle of the mirrors 18 and 19 will permit the reflection of objects forwardly and at the sides of the rear end of the conduit or rear portion of the vehicle as well as objects appearing directly outwardly from the sides of the conduit and slightly rearwardly thereof.

It is believed that the details of construction and manner of use of the device will be readily understood from the foregoing without further detailed explanation.

Having described the invention, what is claimed as new is:

1. A vehicle periscope comprising a conduit adapted for mounting in the top of a vehicle with the front end of the periscope open and having a downwardly inclined end wall positioned in front of the driver, a plurality of longitudinally extending vertical partitions in the conduit separating the same into a center compartment and side compartments, said center compartment having an opening in its rear end and said side compartments having openings in their outer sides at their rear ends, reflectors in the side compartments inwardly of the respective rear openings adapted to reflect images forwardly, a lens in each of the rear openings, and a reflector carried by said inclined front end wall in the vision of the driver.

2. A vehicle periscope comprising a conduit adapted for mounting in the top of a vehicle with the front end of the periscope open and having a downwardly inclined end wall positioned in front of the driver, a plurality of longitudinally extending vertical partitions in the conduit separating the same into a center compartment and side compartments, said center compartment having an opening in its rear end and said side compartments having openings in their outer sides at their rear ends, reflectors in the side compartments inwardly of the respective rear openings adapted to reflect images forwardly, an outwardly curved cupped lens in each of the rear openings, and a reflector carried by said inclined front end wall in the vision of the driver.

DYRON L. BRINKLEY.